G. BLAKE & S. A. DAVIS.
Clutch-Devices for Sewing-Machines.

No. 149,564. Patented April 14, 1874.

WITNESSES.
M. M. Cooke
W. H. Bland

INVENTORS.
George Blake
Stephen A. Davis
By Wm R Dame Jr
Their atty

UNITED STATES PATENT OFFICE.

GEORGE BLAKE AND STEPHEN A. DAVIS, OF NEWARK, NEW JERSEY, ASSIGNORS TO GEORGE BLAKE, OF SAME PLACE.

IMPROVEMENT IN CLUTCH DEVICES FOR SEWING-MACHINES.

Specification forming part of Letters Patent No. 149,564, dated April 14, 1874; application filed October 25, 1873.

*To all whom it may concern:*

Be it known that we, GEORGE BLAKE and STEPHEN A. DAVIS, both of the city of Newark, in the county of Essex and State of New Jersey, have invented new and useful Improvements in Clutch Devices for Sewing and other Machines; and we do hereby declare that the following specification, taken in connection with the accompanying drawing, is a full, clear, and exact description thereof, which will enable others skilled in the art to make and use the same.

Our invention relates to a spring-clutch arranged upon the shaft of a sewing or other machine adjacent to the hub of its driving-wheel, in such a manner that they engage each other only when started or run in a forward direction, and running loosely when turned in an adverse direction. Said device consists of a circular piece of thin spring metal with a hole through its center, with about one-half of its rim slitted and depressed outwardly, forming a circular spring-clutch, as shown, which engages a pin or other projection on the hub of the wheel in its forward motion, or slides over the same when turned in an opposite direction. It consists of a further means of preventing the engagement of clutch and wheel by an intermediate washer, provided with a circular opening corresponding to, and through which, the spring-clutch extends to engage the projection on the hub. By turning said washer half a revolution (more or less) the clutch is withdrawn from operating.

Figure 1:
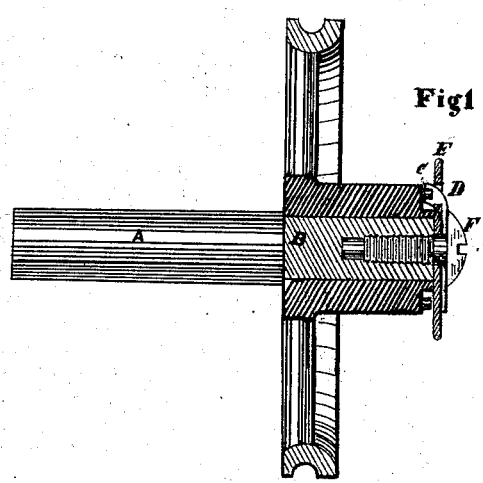
Figures 2, 3:
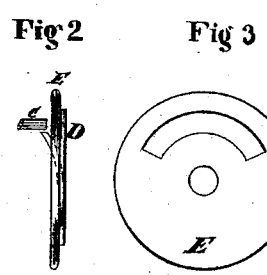
Figure 4:

Referring to the drawings—Figure 1, sections of shaft, wheel, clutch-projection, washer, and screw in position; Fig. 2, section of washer and clutch; Fig. 3, face of washer, exhibiting openings; Fig. 4, spring-clutch, face view.

A is a shaft; B, wheel; C, pin or projection; D, spring-clutch; E, washer; F, screw; H, spring part of D, forming the clutch.

To enable others skilled in the art to make and apply our invention, we will describe its construction and arrangement.

The clutch is formed by dies of a diameter corresponding to the hub of the wheel with which it is to connect, and of a thickness for sufficient strength to perform the work required. A hole is made in the center, in which the shaft A may be fitted and keyed, or the screw E, by which means it is held in position. The clutch part H, which is offset sufficiently to extend to engage the projection C on the hub of the wheel, (more clearly shown in Figs. 4 and 2,) is formed by dies at the same operation in forming the center hole, although these may be formed by any other means.

The washer E, which is interposed between the hub of the wheel and the clutch D, is provided with two openings, (see Fig. 3,) one of which extends half-way around its face, the same distance from the center as the projecting-clutch part H, which it is arranged to receive. Said washer revolves loosely upon the shaft or screw which passes through its center hole. By turning the same upon the shaft a half-revolution the clutch is withdrawn from the opening, and rests upon the face of the washer opposite, enabling the wheel to revolve independently and noiselessly upon the shaft, when applied to a wheel near the end of a shaft. Fig. 1 exhibits a suitable arrangement.

When applied at a distance from the end, the clutch D, or clutch and washer, may be interposed between the hub and a set collar, or otherwise, taking care to have the clutch secured to the shaft.

We would remark that the loose revolving washer E may be dispensed with, although not recommended, as, in its absence, the backward movement of the wheel would cause a continual clicking of the clutch upon the projection of the hub. We would also remark that the spring-clutch might be attached to the hub of the wheel, extending therefrom, engaging a fixed collar with projections, the loose revolving washer interposing, or otherwise.

For proportions, the drawings exhibit suitable dimensions, which may be varied in accordance with the increase or decrease of the wheel or work to be performed.

Modifications of the style and manner of constructing would be considered as equivalent when a spring is applied to a wheel as the only means to engage the parts, as set forth.

Having thus set forth our invention, what we claim as new, and desire to secure Letters Patent of the United States for, is—

1. The disk D with its offset-spring H, substantially as and for the purposes specified.
2. The disk D with its offset-spring H and the washer E, in combination with the hub with the projection C, substantially as herein set forth.

GEO. BLAKE. [L. S.]
STEPHEN A. DAVIS. [L. S.]

Witnesses:
JOHN DANE, Jr.,
JOSEPH CRANE.